United States Patent [19]
Volk

[11] 3,944,413
[45] Mar. 16, 1976

[54] DIRECT REDUCTION OF METALLIC OXIDES

[75] Inventor: William Volk, Princeton, N.J.

[73] Assignee: Hydrocarbon Research, Inc., Morristown, N.J.

[22] Filed: Sept. 16, 1974

[21] Appl. No.: 506,306

Related U.S. Application Data

[63] Continuation of Ser. No. 289,298, Sept. 15, 1972, abandoned.

[52] U.S. Cl. .............................. 75/35; 75/26; 75/91
[51] Int. Cl. ............................................. C21b 13/02
[58] Field of Search............................. 75/26, 34, 35

[56] References Cited
UNITED STATES PATENTS 3,205,066    9/1965   Robson et al. ........................... 75/26
3,428,446    2/1969   Locke, Jr. ................................ 75/26

Primary Examiner—M. J. Andrews

[57] ABSTRACT

The capacity and effectiveness of a fluidized multi-bed process for the direct reduction of broad size-range metallic oxides, such as ion oxide particles, can be materially improved by feeding the large-size particles into the uppermost zone and the fine-particle material such as bag dust to the lowest zone of a multiple bed reducer. The larger particles in the upper zones tend to restrain the fine particles from being carried out of the reducer by upwardly flowing reducing gas. In the lower zone location, complete reduction of the fine oxide particles is much more effective, as the reaction is initiated by the fresh reducing gas, which is normally high purity hydrogen.

7 Claims, 1 Drawing Figure

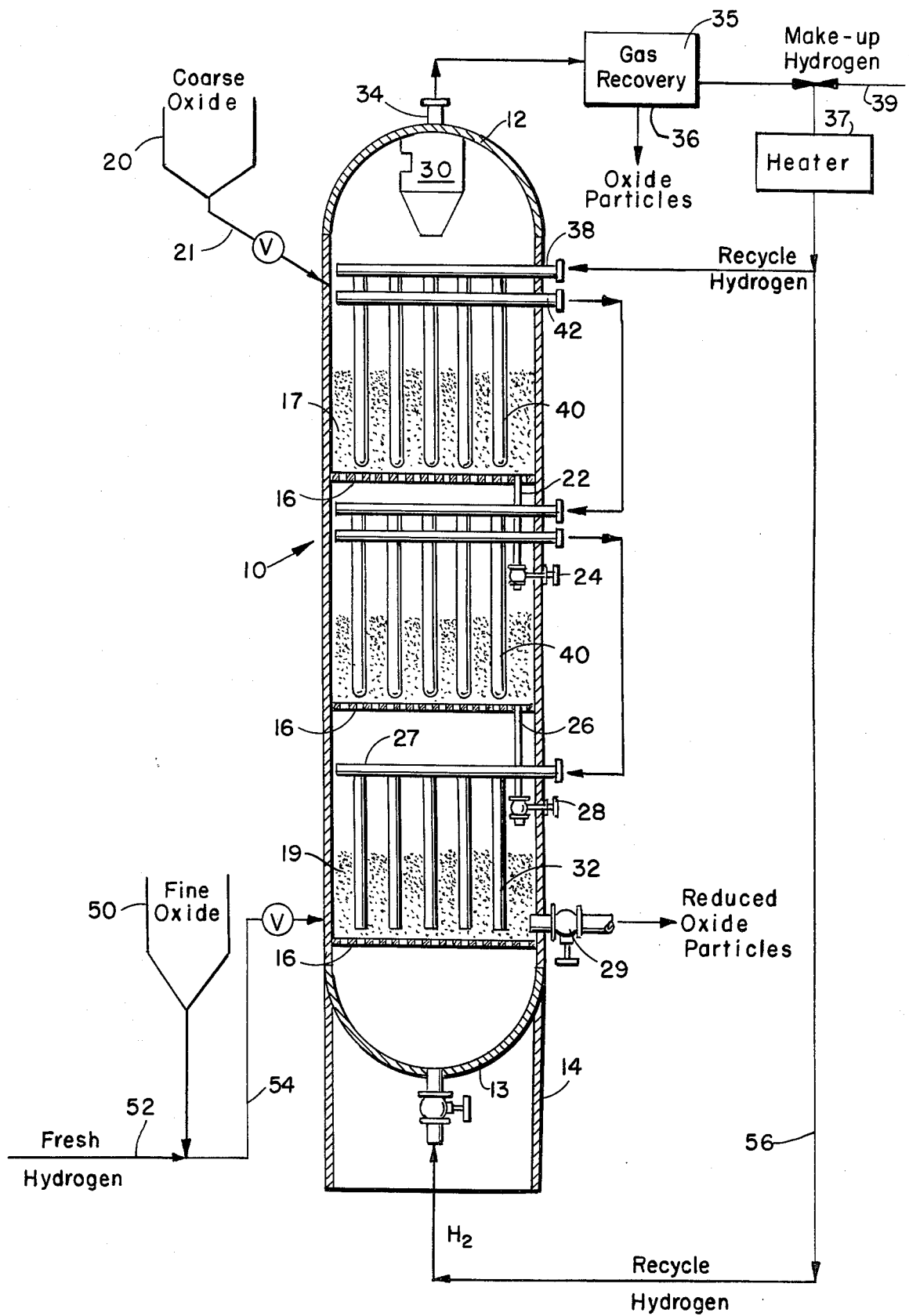

3,944,413

DIRECT REDUCTION OF METALLIC OXIDES

BACKGROUND OF THE INVENTION

This is a continuation of application Ser. No. 289,298 filed Sept. 15, 1972, now abandoned.

The direct reduction of metallic oxides such as iron ores by the fluidization of the ore in an upflowing hydrogen stream is described in U.S. Pat. No. 3,227,546, which, in turn, refers to U.S. Pat. Nos. 2,900,246 and 2,995,426. In such patents, a reducing gas, preferably relatively pure hydrogen, is passed upwardly through several beds of iron oxide or ore at a velocity to maintain the ore fluidized and in random motion in each bed, while the reducing gas reacts with the oxygen molecules to drive off water vapor. From time to time the beds are dropped, i.e., the particulate material in the bottom bed after being substantially reduced to metal is removed, and the upper beds are each moved successively downward for further reduction.

In this art, it has been found necessary for proper operation of the reducer to maintain a fairly close sizing of the iron ore. A typical grind, with all passing 20 mesh (U.S. Sieve Series), would have approximately 40 percent in the 20–100 mesh size, approximately 25 percent in the 100–200 mesh size, and approximately 35 percent smaller than 200 mesh (thus with fines smaller than 200 micron average size). However, experience with fluidized bed processing of the smaller size ore particles has shown excessive solids loss from the upper bed of the reducer. Thus, the reduction of metal oxide powders finer than about 400 mesh such as bag dust has been quite difficult and inefficient. The losses of such powders to the atmosphere poses substantial pollution problems.

SUMMARY OF THE INVENTION

I have now found that I can provide a reasonably uniform fluidization of a broad size range of metallic oxide paricles such as iron oxide wherein the particles vary in size from mill scale which may be as large as ¾ inch size to bag dust having a size of only a few microns (in the order of 400 mesh), by introducing the coarse oxide particles into the uppermost zone of a multi-zone reducer and introducing the fine particles at a low zone in the reducer, preferably to the lowermost zone. In such case, the average particle size establishes the fluidization characteristic in each zone. The smaller particles (400 mesh and finer) are effectively hindered in their fluidization path by the larger particles so that excessive carryover of such fine particles from the top of the reducer is avoided. Furthermore, reduction of these fine particles to metallic powder is quite rapid and complete in a single zone.

DESCRIPTION OF THE DRAWING

The drawing is a schematic flow diagram in part and a vertical section of a multiple bed reducer in part as arranged for use in this invention.

DESCRIPTION OF PREFERRED EMBODIMENT

The multiple bed reducer 10 as generally shown is preferably a cylindrical tower having a top 12 and bottom 13, with the bottom being supported from a foundation as by extension 14. The reducer is divided into a plurality of beds or reaction zones, which are established by perforated horizontal partitions 16 of which three are shown in this instance. These reaction zones 17, 18 and 19 respectively serve to receive and hold the iron oxide material for reduction. The coarser size particulate oxide material is introduced into the top bed from coarse oxide hopper 20 throuogh inlet conduit 21. The coarse oxide hopper 20 is pressurized to overcome the pressure in the reaction zone 17. The fine oxide material in hopper 50 is fluidized with cold hydrogen and is preferably introduced directly into the lowest bed 19 of reducer 10 through conduit 54.

In reducer 10, the iron oxide in each of the multiple beds is intimately contacted and reacted with high purity hydrogen at temperatures in the range of about 700° to 1000°F, preferably about 850°F to 950°F, and at pressures in the range of about 200 to 600 psig (pounds per square inch gauge), preferably about 350 to 450 psig. For the purpose of this invention, high purity hydrogen contains only small amounts of such gases as carbon monoxide and dioxide, methane, nitrogen and water vapors. More specifically, the high purity hydrogen used in the process of this invention generally has a composite average molecular weight in the range of about 3 to 7.5, preferably less than about 5.5 Since hydrogen has a molecular weight of 2 and the aforesaid admixed gases have molecular weights varying from 16 to 44, it is obvious that the quantities of the admixed gases must be kept small to hold the composite average molecular weight below the upper limit of 7.5. Furthermore, the moisture content must be kept below the range of 0.5 to 3.0 percent by volume, as set forth in the aforesaid Keith et al., U.S. Pat. No. 2,900,246.

To effect the intimate contact between the finely divided iron oxide and the reducing hydrogen in accordance with this invention, the iron oxide is maintained as a bed, usually not exceeding about 10 feet in depth, while the pressurized high-purity hydrogen is passed upwardly therethrough at a rate sufficient to fluidize the particles. For the usual particle sizes and densities of the iron oxide as treated by this invention, the reducing gas will generally have a superficial linear velocity of the order of 0.5 to 2.0 feet per second while contacting the mass of iron oxide particles.

By operating at pressures in the range of 200–600 psig, the moisture content of the reaction gases withdrawn from the top of the reducer at 34 is rapidly reduced to less than 0.4 percent by volume by cooling the gases to a temperature of 100°F or lower with water at temperatures available in most localities. While not fully shown herein, it is contemplated that such gases will be recycled as described in Keith et al., U.S. Pat. No. 2,900,246, provided, of course, that a certain proportion of the gases will be vented or discarded to prevent the content of methane and nitrogen from building up to an extent that the mixed recycle and make-up gases have a composite average molecular weight exceeding 7.5.

For the purpose of this invention, the recycle hydrogen reducing gas removed from gas recovery unit 35 is heated to about 1200°F in heater 37 and is introduced into the reducer unit 10 at manifold 38. As described in the Stotler, U.S. Pat. No. 2,805,144, it is then passed through U-shaped heat exchange piping 40 located within the upper bed 17 of iron oxide. The gas is then removed through header 42, and similarly introduced into U tubes 40 in intermediate bed 18. After removal from the intermediate bed, the reducing gas which has cooled to about 1000°F is then introduced directly into the lowest bed 19 through manifold 27 and piping 32, the latter being open at its lower ends. The warm hydrogen then passes upward through the oxide beds in succession, then passes through gas separator 30 for removal of entrained oxide particles, and is removed from the reducer through top opening 34. Following recovery of any remaining oxide particles at 36 from gas recovery unit 35, the hydrogen is reheated and recycled as above. If desired, some warm recycle hydrogen may be introduced directly into the lowermost bed through line 56. Make-up hydrogen is added at 39.

After sufficient reduction is completed in the lowermost bed, the metallized solids are discharged out the bottom through valve 29 as to a briquetting step (not shown). This, in turn, permits dumping the next above oxide bed down through downcomer 26 by opening the valve 28.

Similarly, the top bed may then be passed by gravity downwardly through downcomer 22 when valve 24 is opened. Additional intermediate beds or reduction zones may be used if desired. Thereafter, fresh coarse iron oxide feed is introduced to the top zone through the inlet conduit 21.

Normally a coarse fluidizable grind of iron oxide such as iron ore has a size range substantially as follows:

All pass 20 mesh (USS).
25–40 percent larger than 100 mesh.
25 percent or less passing 325 mesh.

I have now found, however, that in some steel mills, the waste iron oxide ranges from mill scale in sizes ¾ inch to 8 or 10 mesh down to fine oxide dust from oxygen steel furnaces in sizes smaller than 325 mesh. Such dust is too fine to be satisfactorily handled in the usual dense phase fluid bed process. However, in accordance with my invention, I can feed the larger than 400 mesh iron oxide material to the upper bed through line 21. The fine dust smaller than 400 mesh size is fed with unheated hydrogen at 52 from hopper 50 through conduit 54 directly into the lower bed. The reduction rate of the fine dust is fast enough so that it will be substantially completely reduced in the bottom bed by the time it is desired to dump the next above oxide bed into the lowermost bed. The fine iron oxide particles introduced directly into the lowermost bed may comprise up to about 30 percent of the total oxide feed material to the multi-bed reducer.

Injecting the fine oxide dust into the bottom bed of the reducer will greatly minimize the amount of fines that are carried out of the top of the reducer 10.

A typical composition of the total iron oxide wastes available at a commercial steel plant are as follows:

| | |
|---|---|
| Mill scale | 27% |
| Pellet chips | 48% |
| Basic Oxygen Furnace (Dust | 12% |
| Blast Furnace Dust | 13% |

In view of the various modifications of the invention which will occur to those skilled in the art, only such limitations should be imposed as are indicated by the appended claims.

I claim:

1. In a method for the direct reduction of metallic oxide particles in a multiple zone reducer using upflowing hydrogen to maintain the particles of oxides in a fluidized condition at a temperature from about 700°F to about 1000°F and a pressure from about 200 to about 600 psig, and in which a part of the oxides of coarse size range are introduced to the uppermost zone and from which zone the particles pass successively downward to a lower zone after being appropriately contacted with the upflowing hydrogen and the reduced metal particles are removed, the improvement which comprises:
   a. separately feeding finer size metal oxide particles directly to a lower zone using cold hydrogen gas as the transport medium for said finer size metal oxides;
   b. initially contacting the finer oxide particles with high purity hydrogen in said lower zone to accomplish a substantially short and complete reduction within said zone;
   c. passing the hydrogen from the lowermost zone to an upper zone; and
   d. withdrawing the reduced fine oxide along with said reduced metal particles from the lowermost zone.

2. The method of claim 1 wherein the fine oxide particles are carried by pressurized cold high purity hydrogen gas directly into the lowermost zone of the reducer.

3. The method of claim 2 wherein the particles are iron oxide from the group including mill scale, pellet chips, basic oxygen furnace dust, and blast furnace dust, and the particles fed to the upper zone are larger than about 400 mesh size, and the particles fed to the lower zone are smaller than about 400 mesh size.

4. The method of claim 3 wherein the smaller size metal oxide particles fed into the lower zone comprise up to about 30 percent of the total metal oxide feed material to the reducer.

5. The method of claim 4 wherein the finer size oxide particles are introduced directly into the lowermost bed and the metal oxide in each bed is passed to the next lower bed sequentially commencing with the lowermost bed.

6. The method of claim 1 comprising the further steps of:
   a. withdrawing used hydrogen containing up to about three percent water vapor from the uppermost zone;
   b. cooling said hydrogen and removing substantially all the moisture from the hydrogen;
   c. adding sufficient high purity hydrogen to overcome system losses;
   d. reheating the hydrogen to about 1200°F;
   e. recycling the heated high purity hydrogen through flow passages located in the reducer zones to preheat the metal oxide therein; and
   f. recycling a portion of the heated high purity hydrogen directly to the lowermost zone.

7. The method of claim 6 wherein the fine metallized particles discharged from the lowermost bed are passed to a briquetting step.

* * * * *